United States Patent [19]

Bannai et al.

[11] Patent Number: 4,987,428

[45] Date of Patent: Jan. 22, 1991

[54] COLOR IMAGE FORMING APPARATUS

[75] Inventors: Kazunori Bannai; Yutaka Koizumi, both of Yokohama; Mitsuru Mamizuka, Tokyo, all of Japan

[73] Assignee: Ricoh Company, Ltd., Tokyo, Japan

[21] Appl. No.: 388,514

[22] Filed: Aug. 2, 1989

[30] Foreign Application Priority Data

Aug. 25, 1988 [JP] Japan ................................ 63-211458

[51] Int. Cl.$^5$ ........................ G01D 15/06; G03G 15/01

[52] U.S. Cl. .................................... 346/157; 346/154; 355/326

[58] Field of Search ................................ 346/154, 157; 355/326–328

[56] References Cited

U.S. PATENT DOCUMENTS

| | | | |
|---|---|---|---|
| 4,569,584 | 2/1986 | St. John et al. | 346/157 X |
| 4,821,066 | 4/1989 | Foote, Jr. et al. | 346/157 X |
| 4,847,660 | 7/1989 | Wheatley, Jr. et al. | 355/326 X |
| 4,885,596 | 12/1989 | Egawa et al. | 346/157 |
| 4,903,067 | 2/1990 | Murayama et al. | 346/157 X |
| 4,916,547 | 4/1990 | Katsumata et al. | 346/157 X |
| 4,931,815 | 6/1990 | Sato et al. | 346/154 |

*Primary Examiner*—George H. Miller, Jr.

*Attorney, Agent, or Firm*—Oblon, Spivak, McClelland, Maier & Neustadt

[57] ABSTRACT

A color image recording apparatus for producing a composite color image on a paper sheet by developing electrostatic latent images formed on a photoconductive element, which is implemented as a belt, in different colors. The belt is supported and driven in a rotary motion by at least two rollers, i.e., a drive roller and a tension roller. The drive roller is fixed in place at a transfer station, while the tension roller is situated downstream of an exposure station with respect to the intended direction of rotation of the belt, i.e., at a developing station side. More specifically, the tension roller is so positioned as not to be effected by a change in the configuration of the belt ascribable to the selective content of developing rollers of individual developing units with the belt. The length of the belt as measured from the exposure station to the transfer station is maintained constant. The belt moves at the same speed at both of the exposure station and transfer station.

6 Claims, 4 Drawing Sheets

COLOR IMAGE FORMING APPARATUS

BACKGROUND OF THE INVENTION

The present invention relates to a color image recording apparatus for producing a color image by selectively developing in different colors a plurality of latent images which are formed on a photoconductive element implemented by a belt and are each associated with respective one of the different colors, on a contact development basis.

Generally, an electronic color copier, color printer or similar color image recording apparatus has a plurality of developing units which individually store toners of different colors, e.g. yellow (Y), magenta (M), cyan (C) and black (BK). The developing units are selectively operated to develop latent images electrostatically formed on a photoconductive element by the toners of different colors. The resulting toner images are sequentially transferred to the same paper sheet one over another to produce a composite color image. A prerequisite with this kind of apparatus is that while a certain developing unit is operating in contact with the photoconductive element, the other developing units be spaced apart from the photoconductive element. Should the developing units not joining in the development under way be held in contact with the photoconductive element, the toners deposited on those developing units would disturb the latent image or the toner image already provided on the element. The above requirement may be met by adopting a system wherein each developing unit is shifted by a solenoid, spring or similar urging means, as proposed in the past. This kind of system, however, results in a complicated and expensive construction.

Recently, a color image recording apparatus of the type using a contact development system is drawing much attention. This kind of apparatus has a photoconductive element in the form of an endless belt. Specifically, among a plurality of developing units, one needed for development is caused into contact with the belt with the others being spaced apart from the belt so as to develop a latent image associated with a particular color and formed on the belt. The contact development system allows the development units to be moved into and out of contact with the belt by using the flexibility of the belt, thereby promoting the ease of selective development of latent images. A problem with the contact development system, however, is that when any of the developing units is urged against the belt, the belt is displaced at the contacting position and the amount such displacement varies in association with the developing unit. Hence, the timing for the belt to move away from an exposure station to a transfer station or the length of the belt between the exposure station and the transfer station depends on the developing unit. This prevents the toner images of different colors from being accurately brought into register with each other on the same paper sheet, resulting in the deviation of as well as banding.

SUMMARY OF THE INVENTION

It is therefore an object of the present invention to provide a color image recording apparatus capable of producing a high-quality color image surely and stably by selectively developing electrostatic latent images which are formed on a photoconductive element in the form of a belt and are individually associated with different colors.

It is another object of the present invention to provide a color image recording apparatus which eliminates the dislocation or misregister of individual images formed on a belt which is ascribable to the selective contact of developing units and the belt.

It is a further object of the present invention to provide a generally improved color image recording apparatus.

A color image recording apparatus for transferring and recording a color image representative of a document on a paper sheet of the present invention comprises a photoconductive element in the form of a movable belt, optics for exposing the belt to the color image color by color at an exposure station to sequentially form electrostatic latent images which are individually associated with the colors, developing means located at a developing station adjacent to the belt and comprising a plurality of developing units each storing a developer of different color, the developing units being selectively caused into and out of contact with the belt to develop the latent images into visible images by the developers, transferring means for sequentially transferring the visible images of different colors one over another to the paper sheet at a transfer station, and at least two rollers supporting and moving the belt, one of the two rollers comprising a drive roller fixed in place at the transfer station and the other comprising a tension roller which is located downstream of the exposure station in such a manner as to be displaceable in a predetermined direction in response to a change in the configuration of the belt, whereby the length of the belt as measured from the exposure station to the transfer station is maintained constant.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
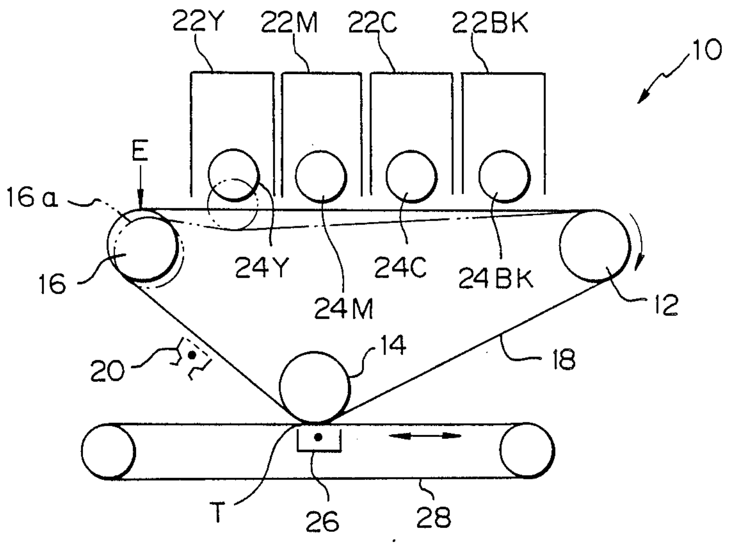
Fig. 1 PRIOR ART
FIG. 1 is a sectional side elevation schematically showing a prior art color image recording apparatus implemented by the contact development system.

To better understand the present invention, a brief reference will be made to a prior art color image forming apparatus of the type concerned, shown in FIG. 1. As shown, a prior art image forming apparatus, generally 10, has a photoconductive element in the form of an endless belt 18 which is passed over a plurality of rollers 12, 14 and 16. While the belt 18 is rotated by the rollers 12 to 16 in a direction indicated by an arrow in the figure, it is uniformly charged by a main charger 20. As the charged surface of the belt 18 is brought to an exposure station E, imagewise light representative of a certain color component associated with a document image is focused onto the charged surface via optics (not shown) resulting in a latent image being electrostatically formed on the belt 18. Developing units 22Y, 22M, 22C and 22BK store respectively a yellow (Y) toner, a magenta (M) toner, a cyan (C) toner, and a black (BK) toner and have respectively developing rollers 24Y, 24M, 22C and 22BK. To develop a latent image associated with a yellow component, for example, the developing roller 24Y of the developing unit 22Y is brought into contact with the belt 18 while the other developing rollers 24M, 24C and 24BK are spaced apart from the belt 18. The resulting yellow toner image formed on the belt 18 is transported by the belt 18 toward a transfer station T, as indicated by an arrow in the figure. At the transfer station T, where the roller 14 is located, a transfer charger 26 transfers the toner image from the belt 18 to a paper sheet (not shown). Subsequently, an electrostatic latent image associated with another color component is formed on the belt 18 by the same procedure, then developed by another developing unit containing a toner of associated color to become a toner image, and then transported to the transfer station T. On the other hand, the paper sheet carrying the yellow toner image is moved back and forth by way of the transfer station T by a transport belt 28, so that the second-mentioned toner image is transferred to the paper sheet over the yellow toner image to produce a color image.

In the contact development system described above, when any of the developing rollers 24Y, 24M, 24C and 24BK is pressed against the belt 18, the belt 18 is displaced at the contacting position because its circumferential length is predetermined. Hence, a shaft supporting any of the rollers 12, 14 and 16 has to be displaced by an amount corresponding to the displacement of the belt 18. Specifically, assume that the rollers 12 and 14 are implemented as a drive roller and a transfer roller, respectively, and are fixed in place as shown in FIG. 1, and that the roller 16 is implemented as a tension roller. Then, an arrangement is made such that, when the belt 18 is displaced in the event of development, the tension roller 16 is displaced inwardly, as indicated by a phantom line 16a in the figure. Further, in the contact development system, the loop configuration of the belt 18 changes from a condition wherein any of the developing rollers 24Y, 24M, 24C and 24BK is urged against the belt 18 to a condition wherein the former is spaced apart from the latter. Assuming that the developing rollers 24Y, 24M, 24C and 24BK thrust themselves against the belt 18 by the same amount as each other, then the displacement of the belt 18 differs from one developing station to another, i.e., from one developing roller to another. At the same time, the travelling speed of the belt 18 as measured at the exposure station E changes, and so does the timing for the image formed on the belt 18 to move to the transfer station T away from the exposure station E. In addition, the length of the belt 18 as measured from the exposure station E to the transfer station T by way of the developing stations associated with the individual developing rollers 24Y, 24M, 24C and 24BK differs from a condition wherein any of the developing rollers is urged against the belt 18 to a condition wherein all of them are spaced apart from the belt 18. This prevents images of different colors from being brought into accurate register with each other and, thereby, causes deviation of colors, critically lowering the quality of the resulting color image.

Figure 2:
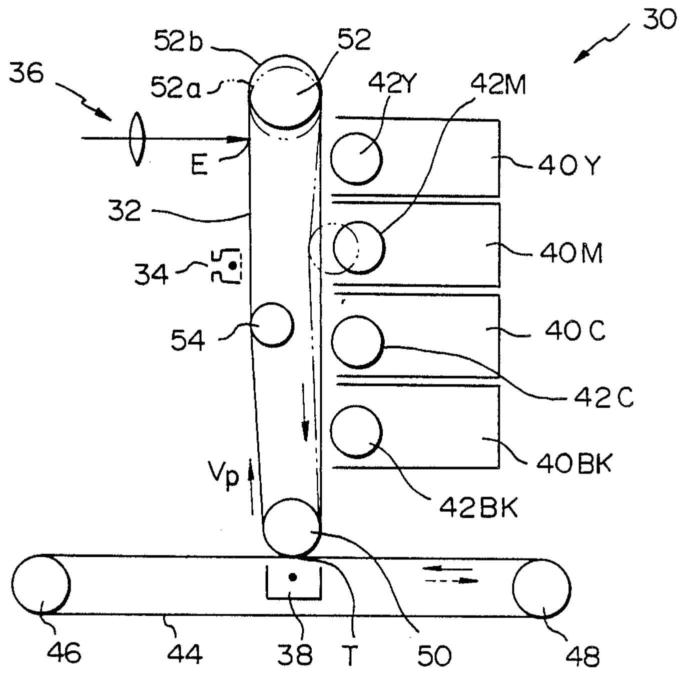
FIG. 2 is a sectional side elevation schematically showing a color image recording apparatus embodying the present invention.
Figure 3:
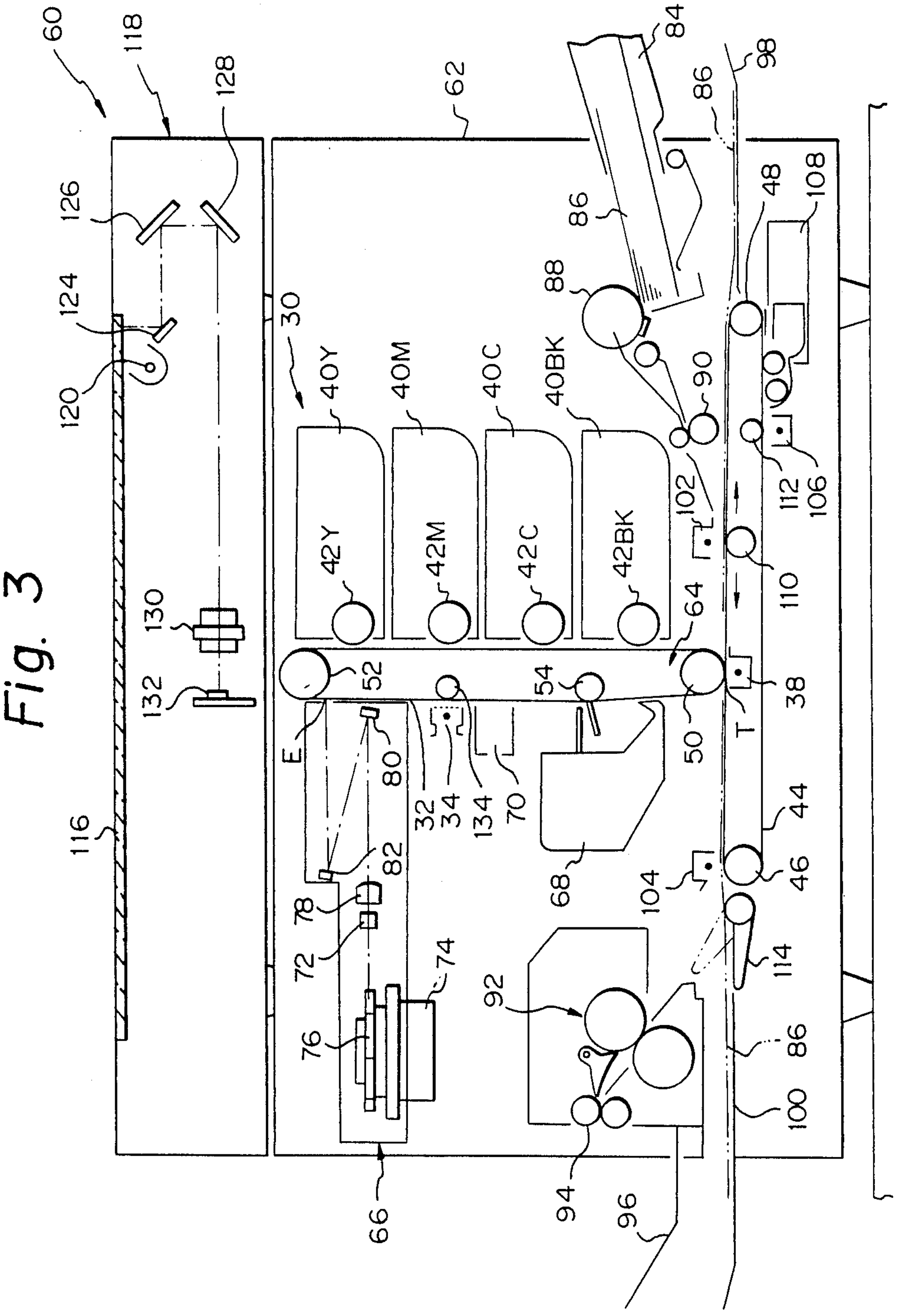
FIG. 3 is a sectional side elevation showing a full-color recording apparatus in which a photoconductive element in the form of a belt and developing units shown in FIG. 2 are incorporated.
Figure 4:
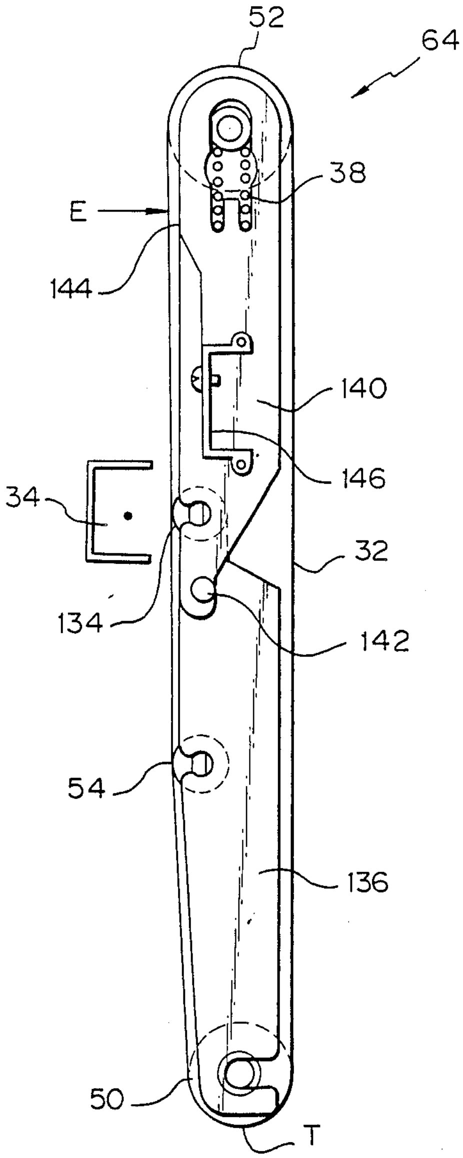
FIG. 4 is a side elevation of a belt unit.

Referring to FIGS. 2 to 4, a color image recording apparatus embodying the present invention is shown. The illustrative embodiment is also implemented by the contact development system, as shown in FIG. 2. The color image recording apparatus, generally 30, has a photoconductive element in the form of a flexible endless belt 32 which is driven clockwise as indicated by an arrow. Arranged around the belt 32 for executing a sequence of electrophotographic steps are a main charger 34, optics 36 which focuses imagewise light onto an exposure station E, a transfer charger 38 located at a transfer station T, and a plurality of developing units. In the illustrative embodiment, the developing units comprise developing units 40Y, 40M, 40C and 40B which store respectively a yellow toner Y, a magenta toner M, a cyan toner C and a black toner BK and have respectively developing rollers 42Y, 42M, 42C and 42BK. The developing units 40Y, 40M, 40C and 40BK are sequentially arranged one above another, as illustrated. The developing rollers 42Y, 42M, 42C and 42BK are usually spaced apart from the belt 32 and are selectively moved into contact with the belt 32. It is to be noted that the sequence of colors shown and described is only illustrative and not limitative. A transfer belt 44 is made of a dielectric material and passed over a pair of rollers 46 and 48. Located below the belt 32, i.e., at a transfer station T, the transfer belt 44 is movable in opposite directions to transport a paper sheet being carried thereon back and forth, as described in detail later. The belt 32 are supported by a plurality of rollers, three rollers 50, 52 and 54 in the illustrative embodiment, in a substantially vertical position. The roller 50 which is a drive roller is fixed in place at the transfer position T. The roller 52 is positioned at the top of the belt 32 and plays the role of a tension roller which is movable up and down. The tension roller 52 is positioned downstream of an exposure station E with respect to the direction of rotation of the belt 32, i.e. at the developing station side. The roller 54 is fixed in place at a cleaning station which follows the transfer station T, serving as a cleaning back-up roller.

In operation, the drive roller 50 rotates the belt 32 at a speed of Vp, as indicated by an arrow in FIG. 2. The main charger 34 uniformly charges the belt 32 being so rotated. When the charged belt 32 reaches the exposure station E, it is exposed to imagewise light associated with a magenta component, for example, by the optics 36 resulting in a latent image being electrostatically formed thereon. As the latent image is moved toward the developing stations and immediately before the leading edge thereof reaches the magenta developing roller 42M, the developing roller 42M is moved to a position where it contacts the belt 32 in a predetermined condition, as indicated by a phantom line 42a in FIG. 2. The other developing rollers 42Y, 42C and 42BK are retracted away from the belt 32. In this condition, the latent image is developed by the developing roller 42M. Immediately after the trailing edge of the latent image has moved away from the developing station where the developing roller 42M is located, the roller 42M is retracted away from the belt 32, i.e., to an initial or non-contact position. On reaching the transfer station T, the magenta image on the belt 32 is transferred by the transfer charger 38 to a paper sheet on which a yellow image Y, for example, may have been transferred beforehand. At this instant, imagewise light associated with a cyan component, for example, may begin to be focused on the belt 32 at a suitable timing at the exposure station E.

Such a procedure may be repeated to produce a color image.

When the developing roller 42M is urged against the belt 32 for developing a latent image in magenta M, as shown in FIG. 2, the tension roller 52 is displaced downwardly to a position indicated by a phantom line 52*a*. As a result, the loop configuration of the belt 32 changes. Nevertheless, since the drive roller 50 is fixed in place and the tension roller 52 is located downstream of the exposure station E, the exposure station E and transfer station T remain unchanged despite the change of the belt configuration, as seen from the solid-line position 52*b* and phantom-line position 52*a* of the developing roller 52 shown in FIG. 2. This allows the belt 32 to have a constant length with no regard to the movement of the developing roller 42M into and out of contact with the belt 32, while causing the belt 32 to move at a constant speed at the exposure station E which is the same as the speed Vp being set up by the drive roller 50 at the transfer station T. Hence, a latent image associated with a certain color component can be formed without banding at the exposure station E while a latent image associated with another color component is developed, because the belt 32 moves at a constant speed at the exposure station E. This is also true for the register of images of the other colors at the transfer station T, i.e., the length of the belt 32 as measured from the transfer station T to the exposure station E remains the same to eliminate the deviation of images of different colors as to the position and, therefore, that of colors.

FIG. 3 shows a full-color image recording apparatus 60 in which the belt 32 is incorporated. The belt 32 is constructed into a belt unit 64 as shown in FIG. 4 and is located at the center inside of a housing 62 of the apparatus 60. Arranged around the belt 32 are the developing units 40Y, 40M, 40C and 40BK, i.e., developing rollers 42Y, 42M, 42C and 42BK, transfer charger 38, main charger 34, and an optical writing unit 66 which includes the optics 36, a belt cleaner 68 and a discharger 70. Implemented as a laser scanner known in the art, the optical writing unit 66 has a semiconductor laser 72, a polygon motor 74, and a polygon mirror 76. A laser beam issuing from the laser 72 is steered by the polygon mirror 76 which is driven in a rotary motion by the polygon motor 74. The beam from the mirror 76 scans the belt 32 at the exposure station E via an F-theta lens 78 and mirrors 80 and 82.

The transfer belt 44 is supported in a substantially horizontal position by the rollers 46 and 48 which are a drive roller and a driven roller, respectively. A paper cassette 84 is loaded with a stack of paper sheets 86. A feed roller 88 and a register roller 90 are situated above the right end of the transfer belt 44, while a fixing unit 92, a paper discharge roller 94 and a paper tray 96 are sequentially located in this order above the left end of the transfer belt 44. Substantially horizontal guide plates 98 and 100 are individually located at opposite ends of the transfer belt 44 so as to guide a paper sheet 86 being moved back and forth. Disposed around the transfer belt 44 are an adhesion charger 102, a separation charger 104, a discharger 106, and a belt cleaner 108. The charger 102 causes the paper sheet 86 to electrostatically adhere to the transfer belt 44. The separation charger 104 is positioned immediately above the drive roller 46 to separate the paper sheet 86 from the transfer belt 44. A switching roller 110 is located between the upper and lower runs of the belt 44 to face the adhesion charger 102. The switching roller 110 is controllably movable up and down to move transfer belt 44 toward and away from the belt 32, while serving as a counter electrode of the charger 102 also. The reference numerals 112 and 114 designate respectively a counter electrode of the discharger 106, and a switching pawl for steering the paper sheet 86.

A color image reader 118 is disposed in an upper portion of the casing 62 for reading a document (not shown) which is laid on a glass platen 116.

Implemented as a digital scanner, the color image reader 118 is made up of a lamp 120, mirrors 124, 126 and 128, a lens 130, and a CCD (Charge Coupled Device) array 132. For the separation of red (R), green (G) and blue (B) color components, a filter device and the like are used, although not shown in FIG. 3.

As shown in FIG. 4, the belt unit 64 has a roller 134 which is located to face the main charger 34 to coact with the latter. The roller 134 is supported by a side panel 136 rotatably but not movably otherwise, together with the drive roller 50 and cleaning back-up roller 54. Another side panel 140 is connected to the side panel 136 by a pin 142. The tension roller 52 is displaceably and rotatably supported by the side panel 140 while being constantly biased outwardly by a compression spring 138. Also shown in FIG. 4 are a back-up member 144 for insuring the planeness of the belt 32, and a stay 146.

Figure 5:
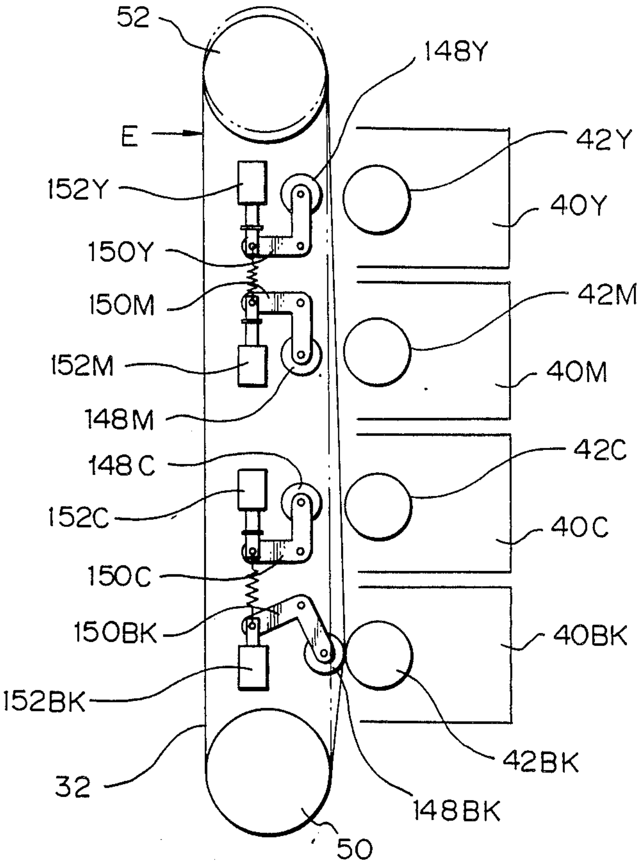
FIG. 5 is a sectional side elevation schematically showing a modified form of the embodiment of FIG. 2.

A modified form of the embodiment shown and described is shown in FIG. 5. In this modification, all the developing units 40Y, 40M, 40C and 40BK, i.e., the developing rollers 42Y, 42M, 42C and 42BK are fixed in place, while the belt 32 is movable into contact with any of the dveloping rollers 42Y, 42M, 42C and 42BK. Specifically, rollers 148Y, 148M, 148C and 148BK are located between the opposite runs of the belt 32 and in positions where they face the developing rollers 42Y, 42M, 42C and 42BK, respectively. The rollers 148Y, 148M, 148C and 148BK are selectively caused into pressing contact with the back of the belt 32 by their associated levers 150Y, 150M, 150C and 150BK and solenoids 152Y, 152M, 152C and 152BK. Such an alternative construction allows even the developing unit switchover mechanism to be provided incorporated in the belt unit 64, thereby simplifying the overall construction of the apparatus and saving the cost therof.

In any of the embodiment and modification thereof described above, the drive roller 50 bifunctioning as a drive roller and a transfer roller may be replaced with an exclusive drive roller and an exclusive transfer roller.

In summary, in accordance with the present invention, a color image forming apparatus has at least two rollers, i.e., a drive roller and a tension roller which support and rotate a photoconductive element in the form of an endless belt. The drive roller is fixed in place at a transfer station, while the tension roller is situated downstream of an exposure station, i.e., at a developing station side. The transfer station and exposure station, therefore, remain unchanged. More specifically, the tension roller is so located as not to be effected by the change in the configuration of the belt ascribable to the movement of developing rollers into and out of contact with the belt. The length of the belt between the exposure station and the transfer station remains constant and, yet, the belt is driven at the same speed as measured at the exposure station and transfer station. This eliminates the banding and deviation of images otherwise caused by the movement of the developing rollers into and out of contact with the belt, thereby insuring high-quality color images.

Various modifications will become possible for those skilled in the art after receiving the teachings of the present disclosure without departing from the scope thereof.

What is claimed is:

1. A color image recording apparatus for transferring and recording a color image representative of a document on a paper sheet, comprising:

a photoconductive element in the form of a movable belt;

optics for exposing said belt to the color image color by color at an exposure station to sequentially form electrostatic latent images which are individually associated with the colors;

developing means located at a developing station adjacent to said belt and comprising a plurality of developing units each storing a developer of different color, said plurality of developing units being selectively caused into and out of contact with said belt to develop the latent images into visible images by said developers;

transferring means for sequentially transferring the visible images of different colors one over another to the paper sheet at a transfer station; and at least two rollers supporting and moving said belt, one of said at least two rollers comprising a drive roller fixed in place at the transfer station and the other comprising a tension roller which is located downstream of the exposure station in such a manner as to be displaceable in a predetermined direction in response to a change in configuration of said belt;

whereby a length of said belt as measured from the exposure station to the transfer station is maintained constant.

2. An apparatus as claimed in claim 1, wherein each of said developing units comprises a developing roller for supplying the developer to the associated latent image formed on said belt.

3. An apparatus as claimed in claim 2, wherein said developing rollers are individually movable into and out of contact with said belt.

4. An apparatus as claimed in claim 2, wherein said developing rollers are individually fixed in place relative to said belt.

5. An apparatus as claimed in claim 4, wherein said belt is movable into and out of contact with said developing rollers.

6. An apparatus as claimed in claim 1, wherein said drive roller and said tension roller are respectively located in a lower portion and an upper portion of said apparatus.

* * * * *